United States Patent
Csik et al.

(10) Patent No.: US 10,547,453 B2
(45) Date of Patent: Jan. 28, 2020

(54) METHODS FOR DIGITALLY SIGNING AN ELECTRONIC FILE AND AUTHENTICATION METHOD

(71) Applicants: Balazs Csik, Budapest (HU); Csaba Lengyel, Tarnok (HU); Antal Rogan, Budapest (HU)

(72) Inventors: Balazs Csik, Budapest (HU); Csaba Lengyel, Tarnok (HU); Antal Rogan, Budapest (HU)

(73) Assignee: Antal Rogan, Budapest (HU)

( * ) Notice: Subject to any disclaimer, the term of this patent is extended or adjusted under 35 U.S.C. 154(b) by 319 days.

(21) Appl. No.: 15/502,616

(22) PCT Filed: Jun. 15, 2015

(86) PCT No.: PCT/HU2015/000055
§ 371 (c)(1),
(2) Date: Feb. 8, 2017

(87) PCT Pub. No.: WO2016/027111
PCT Pub. Date: Feb. 25, 2016

(65) Prior Publication Data
US 2018/0212782 A1    Jul. 26, 2018

(30) Foreign Application Priority Data

Aug. 18, 2014 (HU) .................................. 1400392
May 29, 2015 (HU) .................................. 1500259

(51) Int. Cl.
*H04L 9/32* (2006.01)
*G06F 21/32* (2013.01)
(Continued)

(52) U.S. Cl.
CPC ............ *H04L 9/3247* (2013.01); *G06F 21/32* (2013.01); *H04L 9/0643* (2013.01); *H04L 9/3268* (2013.01); *H04L 63/0861* (2013.01)

(58) Field of Classification Search
CPC ... H04L 9/0643; H04L 9/3231; H04L 9/3236; H04L 9/3247; H04L 9/3268;
(Continued)

(56) References Cited

U.S. PATENT DOCUMENTS 6,553,494 B1 *   4/2003   Glass .................... G06F 21/32
                                                              713/176
7,346,779 B2     3/2008   Leeper
(Continued)

FOREIGN PATENT DOCUMENTS

CN           1419664 A       5/2003
CN         103888442 A       6/2014
(Continued)

OTHER PUBLICATIONS

European Patent Office, Notification of Transmittal International Search Report (Form PCT/ISA/210, 2 pgs.) dated Oct. 8, 2015.
(Continued)

*Primary Examiner* — Minh Dinh
(74) *Attorney, Agent, or Firm* — Wood Herron & Evans LLP

(57) ABSTRACT

The invention is a method for digitally signing an electronic file (48), comprising the steps carried out by a server:
generating a challenge value (50) comprising a projection parameter (52),
transferring the challenge value (50) to a client device through a communications channel,
receiving, through a communications channel, an evidence record (70), the electronic file (48) to be signed, and a user's biometric data (54) from the client device,
(Continued)

generating reduced biometric verification data by applying a projection utilising the projection parameter (52), generating a verification evidence record and comparing it against the evidence record (70) sent by the client device, generating a server certificate, signing the server certificate applying the server's private signing key, thereby generating a signed server certificate, generating a digital signature by associating at least the signed server certificate and the hash (49) of the electronic file (48), and associating the digital signature with the electronic file (48), thereby generating a digitally signed electronic file. The invention is further an authentication method.

29 Claims, 8 Drawing Sheets

(51) Int. Cl.
*H04L 9/06* (2006.01)
*H04L 29/06* (2006.01)

(58) Field of Classification Search
CPC ............... H04L 9/3271; H04L 63/0823; H04L 63/0861; H04L 63/12; H04L 63/123; G06F 21/32; G06F 21/64; G06F 21/6272
See application file for complete search history.

(56) References Cited

U.S. PATENT DOCUMENTS

| | | | |
|---|---|---|---|
| 8,612,769 B2 * | 12/2013 | Guenther | G06F 21/32 709/238 |
| 9,166,957 B2 * | 10/2015 | Tomlinson | H04L 9/3231 |
| 9,596,088 B1 * | 3/2017 | Oakes, III | H04L 9/3247 |
| 2011/0126024 A1 | 5/2011 | Beatson et al. | |
| 2013/0138964 A1 | 5/2013 | Joyce, III | |

FOREIGN PATENT DOCUMENTS

| | | | |
|---|---|---|---|
| WO | WO 99/33221 | * | 7/1999 |
| WO | 0108352 | | 2/2001 |
| WO | WO 2007/034255 A1 | * | 3/2007 |

OTHER PUBLICATIONS

European Patent Office, International Preliminary Report of Patentability (Forms PCT/IPEA/416, 6 pgs.), dated Nov. 11, 2016.

Jin A T B: Abstract from "Cancellable Biometrics and Multispace Random Projections," Computer Vision and Pattern Recognition Workshop, 2006 Conference on New York, NY, USA Jun. 17-22, 2006, NJ, USA, Jun. 17, 2006 , pp. 164, XP010922679, DOI: 10.1109/CVPRW.2006.49.

Hungarian Patent Office, Search Report, issued in corresponding Hungarian Application No. P1500259, dated Jun. 15, 2016 (2 pages).

Patent Office of the Peoples Republic of China, English Translation of Search Report issued in corresponding Chinese Application No. 2015800564628, dated Mar. 18, 2018 (2 pages).

Orvos, Peter, Use Biometric authentication to produce authentic digital signatures, https://nws.niif.hu/ncd2001/docs/eloadas/80/— English translation (8 pages).

* cited by examiner

METHODS FOR DIGITALLY SIGNING AN ELECTRONIC FILE AND AUTHENTICATION METHOD

This application claims priority, under Section 371 and/or as a continuation under Section 120, to PCT Application No. PCT/HU2015/000055, filed on Jun. 15, 2015, which claims priority to Hungarian Application No. P1500259, filed on May 29, 2015, and to Hungarian Application No. P1400392 filed on Aug. 18, 2014.

TECHNICAL FIELD

The invention relates to methods for digitally signing an electronic file and to a biometrics-based authentication method.

BACKGROUND ART

There is a number of various methods for authenticating and signing electronic files. WO 2007/034255 discloses a method wherein a centralised digital signature providing system is applied for digitally signing electronic files submitted to it on behalf of remote users utilising digital signatures which include the users' biometric data. By means of the biometric data (for example, data related to a handwritten signature) the digital signature can be linked to the signatory, while the invention provides that the digital signature can only be applied to the electronic file in a supervised and authenticated manner. The method has the disadvantage that the verification of the data sent back by the remote user, as well as the management of biometric data, are not sufficiently secure.

In U.S. Pat. No. 6,735,695 B1 a solution is disclosed wherein authentication is performed using only a portion of biometric data rather than the entire biometric sample. For enhanced security it is thereby provided that the full biometric sample is not transmitted. The partial biometric sample applied for authentication can also be selected using a random number. A disadvantage of this known solution is that data reduction (transformation) is not carried out, and thus by eavesdropping on the communication lines for partial biometrics unauthorised persons may sooner or later capture the full biometric information. A further disadvantage of the solution is that the biometric sensor records the full biometric sample, and the partial biometrics are selected from the full sample. Recording the full biometric sample constitutes a significant vulnerability.

US 2008/0209227 A1 discloses a solution wherein a transformed, reduced version of the biometric sample is generated. The reduced biometric data or reduced biometric digest may contain different characteristic features of the biometric sample, such as its linear sections. In US 2010/0066493 A1 a solution related to a random projection transform of biometric data is disclosed. These known solutions also have the above mentioned drawbacks.

The object of the invention is to provide methods for digital signing and for authentication that eliminate the drawbacks of prior art solutions to the greatest possible extent.

The object of the invention has been achieved by the methods according to claims 1, 16, 23, 26 or 27.

Preferred embodiments of the invention are defined in the dependent claims.

BRIEF DESCRIPTION OF THE DRAWINGS

The invention is explained in further detail by means of preferred embodiments illustrated in the accompanying drawings, where.

MODES FOR CARRYING OUT THE INVENTION

Figure 1:
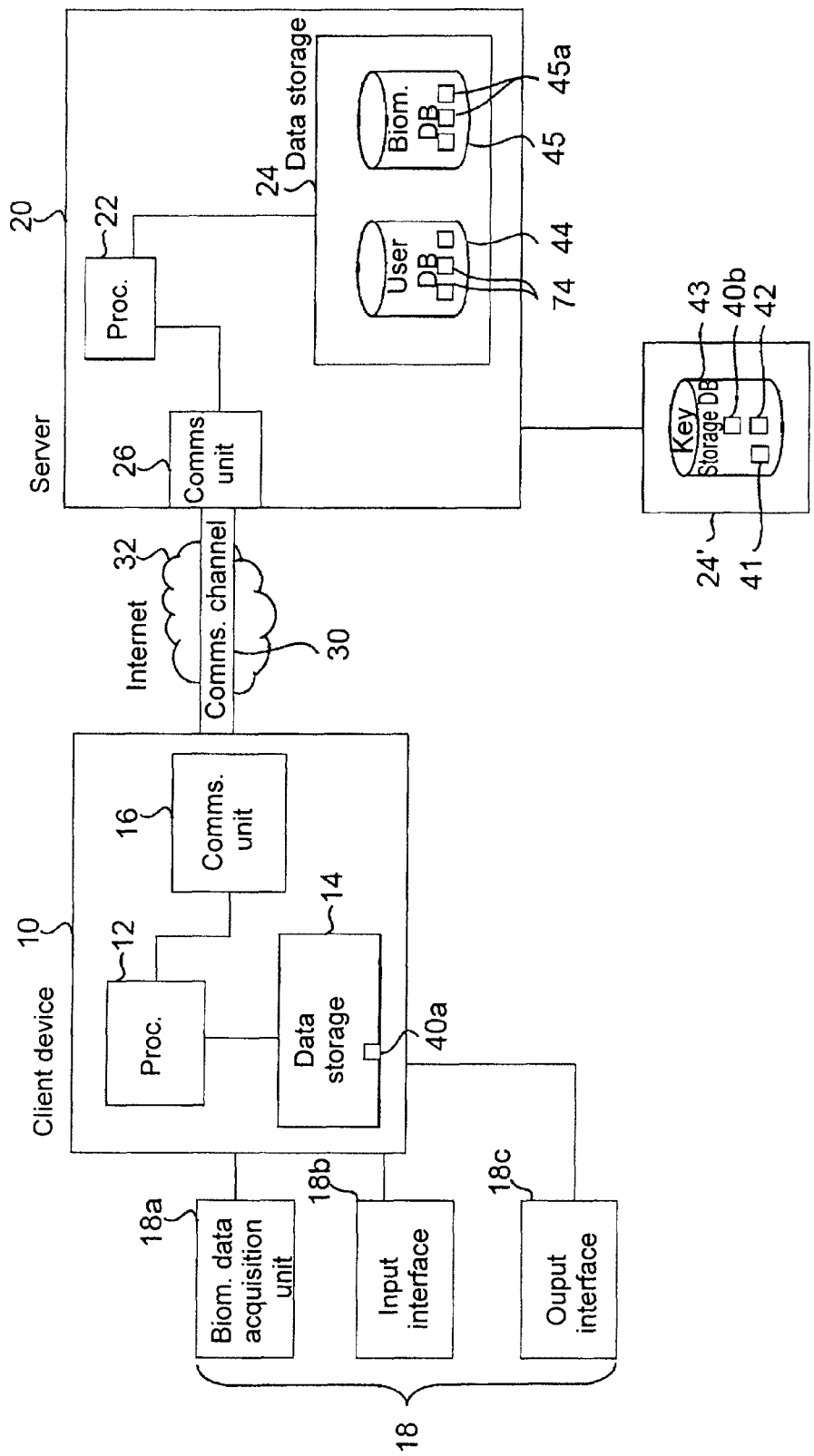
FIG. 1 is a schematic block diagram of main information technology devices applied in the method according to the invention.

The main information technology devices and major components applied in the method according to the invention are shown in FIG. 1. The method according to the invention is adapted for signing by a server 20 an electronic file made available or generated on a client device 10. The client device 10 may be connected to the server 20 through a communications channel 30. Such an electronic communications channel 30 may be established for example within an electronic communications network 32, such as by way of example applying a wired and/or wireless local area network (LAN), a global IT network, particularly the Internet, as well as mobile telecommunications networks corresponding to the 3G or 4G standards, a GSM network, etc.

The client device 10 may be implemented as any such user communications device which comprises one or more processors 12, data storage 14, a client communications unit 16, and peripherals 18. By way of example, the client device 10 may be a desktop, laptop or notebook computer, a cell phone (mobile phone)—particularly a smartphone—, a tablet computer, etc.

In the present embodiment the data storage 14 is shown as an integrated part of the client device 10, but the data storage 14 may also be external data storage means, i.e. the component herein referred to as data storage 14 is meant to comprise any internal and external data storage means accessible by the client device 10. The data storage 14 may be implemented as any type of electronic, magnetic, optical or any other data storage means (such as memory, memory card, hard disk, external disk, etc.) The data storage 14 is preferably applied for storing PKI (Public Key Infrastructure) keys, at least the server's public encryption key 40a corresponding to the server 20. There may also be contemplated an embodiment wherein the server's public encryption key 40a is not stored in the data storage 14 but is made available temporarily for the client device 10, being temporarily downloaded from the Internet for the purposes of the encryption process.

The component referred to as the client communications unit 16 is meant to comprise any hardware and software components (i.e. network card, network connection, WiFi adapter, antenna, etc.) by means of which the client device 10 can establish the electronic communications channel 30 at least with the server 20, over which channel electronic data can be exchanged.

The client device 10 comprises—either as a component thereof or as connected thereto as a peripheral 18 or as an other external unit (i.e., connected in any manner to the client device 10)—a biometric data acquisition unit 18a and preferably at least one input interface 18b and at least one output interface 18c.

By way of example, the biometric data acquisition unit 18a may be a digitizer tablet capable of receiving and recording a handwritten signature as biometric data. The digitizer tablet may be complemented with a digital stylus, but in specific cases the user's finger may also be applied as a "writing device" detected by the digitizer tablet.

The biometric data acquisition unit 18a may, by way of example, be implemented as an iris scanner, whereby an iris image is received, and digital data representing the iris image are stored as biometric data.

The biometric data acquisition unit 18a may also be a fingerprint reader, applying which a fingerprint is received and digital data representing the fingerprint are stored as biometric data.

In addition to that, the biometric data acquisition unit 18a can be a device of any other type adapted for measuring/registering a biometric identifier (for example palm vein pattern, DNS) and for recording the resulting data.

There may also be contemplated an embodiment wherein the biometric data acquisition unit 18a at the same time also functions as the input interface 18b. For example, in addition to receiving handwritten signatures the digitizer tablet may also be applied for inputting user commands for operating the software programs running on the client device 10.

The client device 10 preferably comprises at least one screen utilised as output interface 18c. In addition to that, other output interfaces 18c may be contemplated, by way of example, printers or equipment adapted for writing different digital media (e.g. CD, DVD, floppy disc, memory sticks, memory cards, etc).

The at least one input interface 18b may be implemented, by way of example, as a keyboard, mouse, or other ordinary input device. The output interface 18c may at the same time also be the input interface 18b, for example a touchscreen. Likewise, the data carrier media writer device may at the same time also function as the input interface 18b provided that it is capable of reading and writing media. The keyboard can be implemented as a virtual keyboard, for example in case a touchscreen is applied as screen, a virtual keyboard can be displayed thereon, applicable as an input interface 18b.

In case a touchscreen is applied as input interface 18b and output interface 18c, the touchscreen may also perform the functions of the biometric data acquisition unit 18a, i.e. in specific cases a single peripheral device can perform triple functions.

The server 20 is meant to comprise other IT devices (such as desktop or laptop computers) capable of functioning as a server. The server 20 also comprises one or more processors 22, data storage 24 and a server communications unit 26.

The data storage 24 may be implemented as any type of electronic, magnetic, optical or any other data storage means. In the present embodiment the data storage 24 is shown as an integrated part of the server 20, but the data storage 24 may also comprise external data storage means accessible by the server 20, such as a hardware security module 24' (HSM) shown in FIG. 1. The data storage 24 is thus meant to comprise any internal and external data storage means (such as built-in ROM and RAM, external HSM, other external storage means, etc.) that are directly or indirectly accessible by the server 20.

The server 20 preferably possesses public key infrastructure (PKI) keys and other signing keys, such as the server's private encryption key 40b and server's private signing key 41 corresponding to the server 20, as well as the user's private signing keys 42 corresponding to the user, which can be stored in a key database 43 in the data storage 24, and particularly preferably in the HSM 24'. The data storage 24 may preferably also store a user database 44, and being included in or separate from it, a biometric database 45 adapted for storing biometric templates 45a of the users.

The user's private signing key 42 may, by way of example, also be a private encryption key based on the PKI infrastructure that can be applied by anyone for decrypting encrypted data using the public encryption key, but other signing algorithms not based on encryption are also known. For example, algorithms of HMAC (hash-based message authentication code) type can also be used for the signing. These algorithms involve the generation of a combined hash value from the value of the key and the message itself. The hash has a double function: on the one hand it protects the identity of the message, and on the other it proves that it could only be generated by someone who had possessed the key. The main difference compared to the signing processes of the PKI (RSA) type is that this process essentially involves one type of key, i.e. the user's private signing key 42, but there is no user's public signing key involved, and the signing algorithm consists in hash generation rather than encryption.

As above, the component referred to as the server communications unit 26 is meant to comprise any hardware and software components (i.e. network card, network connection, WiFi adapter, antenna, etc.) by means of which the server 20 can establish the electronic communications channel 30 at least with the client device 10, over which channel electronic data can be exchanged.

In the following, two embodiments of the method according to the invention will be presented with reference to the exemplary hardware components described above.

Figure 2:
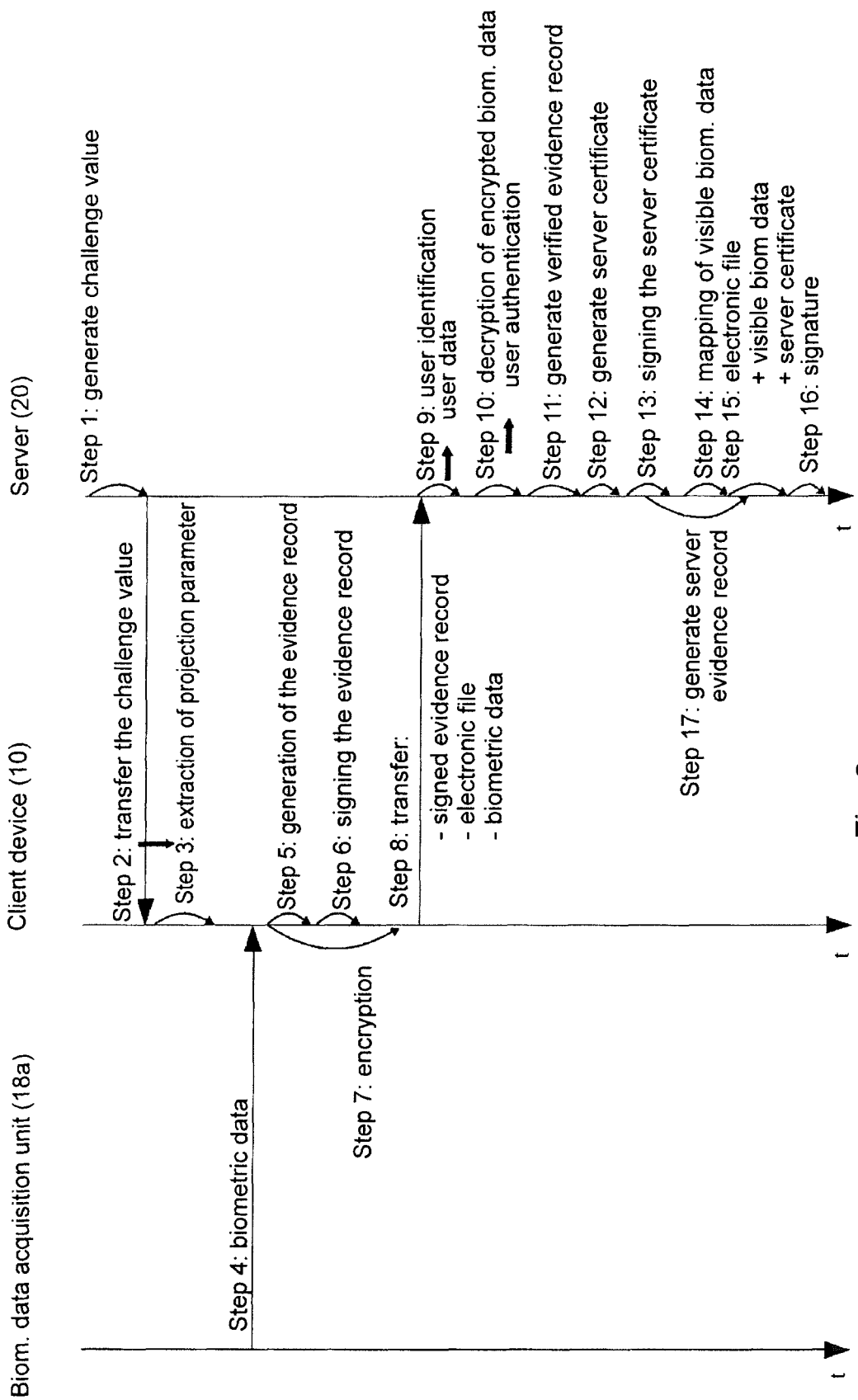
FIG. 2 is an overview flow diagram of the method according to the invention.

In FIG. 2 an overview flow diagram of the method according to the invention is shown. The steps of the method, as well as the documents, data, algorithms and files utilised or generated in the course thereof are illustrated in more detail in FIGS. 2 to 8.

Although for the sake of simplicity the steps have been numbered successively, the order of the steps can be changed in many cases, or certain steps may be carried out simultaneously, may be merged or subdivided, as well as further steps may be included between the steps herein presented, as it is obvious to the skilled person.

The method according to the invention is expediently preceded by the establishment of the communications channel 30 between the client device 10 and the server 20. The communications channel 30 is preferably a secure channel that can be implemented applying by way of example the SSL, TLS, SNPv3, VPN, HTTPS, FTPS, TelnetS, IMAPS, IPSec, etc. protocols, as it is well known to those skilled in the art. In the course of the method the communications channel 30—being a virtual data channel—may be disconnected and reestablished, with optionally more than one virtual data channels being established between the client device 10 and the server 20, but for the sake of simplicity these are collectively referred to as communications channel 30.

The provision of an electronic file 48 to be signed can also be regarded as the starting point of the method according to the invention. The electronic file 48 can be generated utilising the client device 10, and thus it can for example be a document generated on the client device 10 or a picture file taken by the camera of the client device 10 applied as input interface 18b. It may also be contemplated that the electronic file 48 to be signed by the user of the client device 10 is not generated by the client device 10 itself but it is received by the client device 10 from an external source, such as via electronic mail, or the electronic file 48 is downloaded from the Internet or read from a data storage medium (e.g. CD, DVD, memory stick, etc.) applying a (writer)/reader device as input interface 18b, or is received from the server 20 or from elsewhere.

Figure 3:
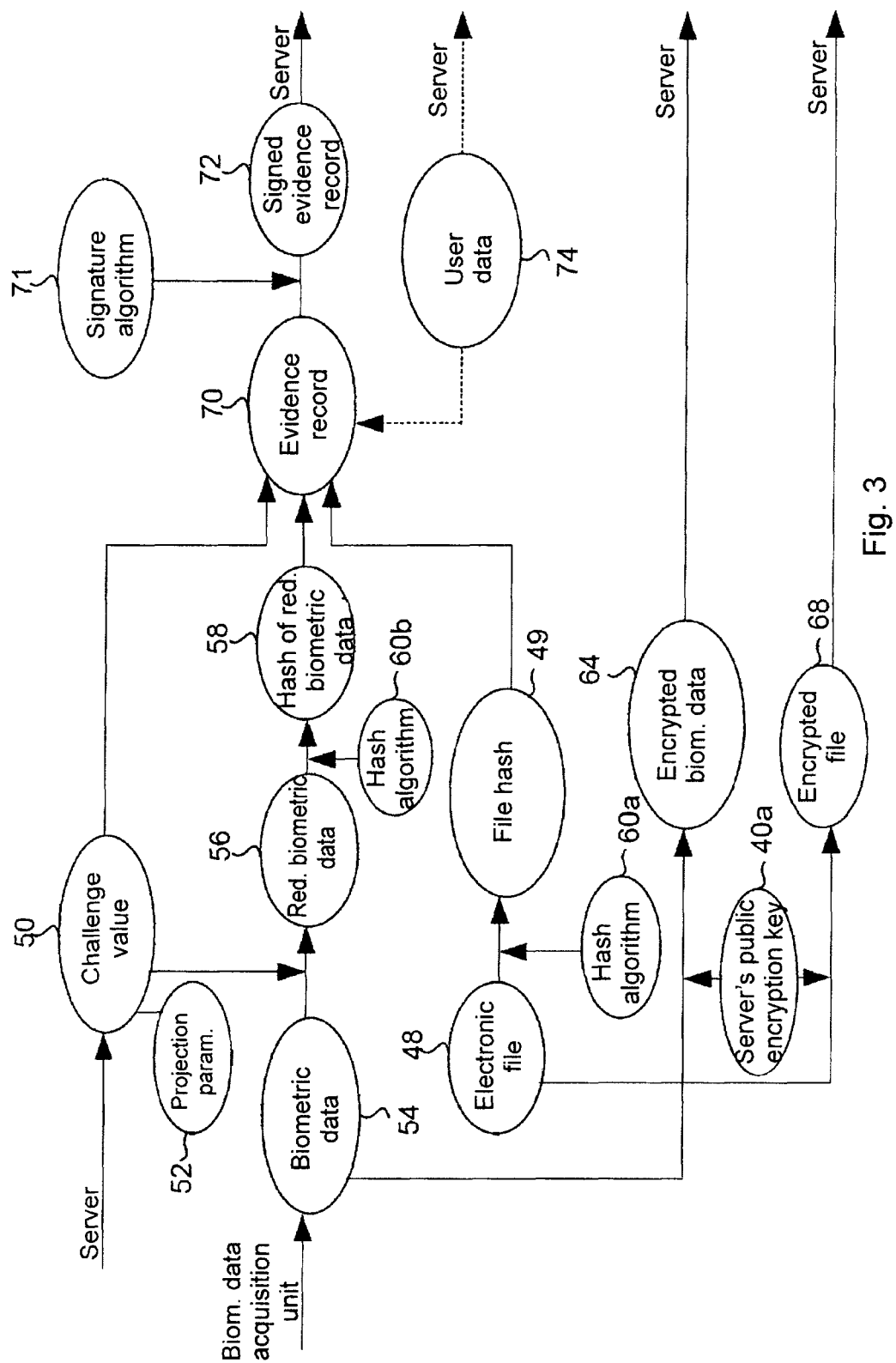
FIG. 3 is a schematic flow diagram of client-side steps of a first embodiment of the method according to the invention.

Steps 1-8 of a first variant/embodiment of the method according to the invention presented in FIG. 2 are illustrated in detail in FIG. 3.

As step 1 of the method according to the invention, a challenge value 50 is generated utilising the server 20. The challenge value 50 comprises one or more projection parameters 52 (typically numbers). The challenge value 50 may optionally also contain a time stamp that is either generated by the server 20 itself, or—upon request of the server 20—by an external time stamp server, for instance according to the RFC3161 protocol.

In step 2 the challenge value 50 is transferred by the server 20 to the client device 10 through the communications channel 30.

In step 3 the client device 10 is applied for extracting the one or more projection parameters 52 from the challenge value 50. This step can of course be carried out any time before using the projection parameters 52, or simultaneously therewith.

In step 4, the user's biometric data 54 are recorded on the client's 10 side utilising the biometric data acquisition unit 18a, the biometric data possibly comprising one or more static or dynamic data items (data sets) recorded based on the physical characteristics of the user. For example, in case a digitizer tablet is applied as biometric data acquisition unit 18a, a handwritten signature produced using a digital stylus or the user's finger as a writing device is received and recorded as biometric data 54. In this case the biometric data 54 may be for example the coordinates of the location of pressing the writing device against the tablet surface, the coordinates of the location of lifting the writing device from the tablet surface, the time function of writing device coordinates, the time function of writing device speed, the time function of writing device acceleration, the time function of writing device pressure force, or a combination of more than one such data.

In a preferred embodiment, during the entering of a handwritten signature an image of the signature is displayed on the screen of the client device 10, applied as the output device 18c, thereby providing visual feedback to the user. This is especially efficient in case the biometric data acquisition unit 18a at the same time also functions as a screen, as with PDA-s, tablet computers, touchscreen cell phones, etc.

If the biometric data acquisition unit is implemented as an iris scanner, an iris image is received, and digital data representing the iris image are recorded as biometric data 54. In case the biometric data acquisition unit is a fingerprint reader, a fingerprint is recorded and digital data representing the fingerprint are stored as biometric data 54.

In step 5, the client device 10 is applied for generating an evidence record 70. During that, the client device 10 is applied for generating a hash 49 of the electronic file 48 utilising a one-way secure hash algorithm 60a, which by way of example be the SHA-256, SHA-512, etc. algorithm. The hash 49 generated utilising the hash algorithm 60a represents such condensed data from which it is impossible to infer the original electronic file 48. A characteristic feature of the hash algorithms 60a is that the modification of any part of the original electronic file 48 causes an avalanche effect in the hash 49, due to which the hash becomes completely different. By generating the hash 49 once again it can be checked whether (unauthorised) changes have been made to electronic file 48, or whether the file has been tampered with. A further important characteristic of the hash algorithm 60a is that no data files can be produced from it for which the algorithm would generate the same hash 49.

The generation of the evidence record 70 also involves the generation of reduced biometric data 56 from the user's biometric data 54 with a projection algorithm applying one or more projection parameters 52. According to the invention the term "projection" is used to refer to one-way mathematical mappings, or other reductions, of data which result in such reduced data that cannot be used for restoring the original data, while at the same time the reduced data can only be generated by a person who is in possession of the original data and knows the projection parameters. Such projection algorithms applying projection (or, in other words, data reduction) parameters are well known for those skilled in the art, the algorithms incorporating, by way of example, the projection of the recorded data on a predetermined plane or axis, or processing the data by means of a neural network. In this case, for example, a static signature image (reduced biometric data 56) can be generated from the dynamic signature data recorded with a handwritten signature recorded as biometric data 54.

The reduced biometric data 56 is characteristic for the user but cannot be applied for restoring the original biometric data 54. The reduced biometric data 56 serves as evidence for that its generator—in our case, the client device 10—had been in possession of the original biometric data 54 and the projection parameters 52 sent with the challenge value 50.

Subsequently, the client device 10 is applied for generating the hash 58 of the reduced biometric data 56 utilising a one-way secure hash algorithm 60b which may be identical to or different from the hash algorithm 60a.

The evidence record 70 is then generated by the client device 10 by associating the challenge value 50, the hash 58 of the reduced biometric data 56, and the hash 49 of the electronic file 48. Data association can be performed applying any known suitable method, such as the bitwise XOR operation which combines the three data in such a manner that none of them can be inferred from the result, but verifiability is retained. As with the above, a hash function adapted for generating a hash (the evidence record 70) by concatenating the three data can also be applied here.

The evidence record 70 may in addition contain further data.

The evidence record 70 proves that the electronic file 48 and the biometric data 54 originate from the given client device 10. In case an external attacker tried to infuse previously recorded biometric data 54 into the system with a document to be signed, he could not produce the evidence record 70 corresponding to it since he does not possess the challenge value 50 (which may optionally also contain a time stamp to prevent tampering). Because the challenge value 50 contains unique parameters generated for each signing event, the biometric data 54 cannot be used twice, either by accident or purposefully.

Next, in step 6 the evidence record 70 is preferably signed applying a digital signing algorithm 71 utilising the client device 10. The signing algorithm 71 can be for example PKI-based (e.g. RSA), password-based, single-use password based or any other solution that can be adapted to suit the given situation. The signing process results in a signed evidence record 72.

In step 7 the biometric data 54 and/or the electronic file 48 to be signed are preferably signed by the client device 10, which may be performed applying PKI-based encryption using the servers public encryption key 40a, such that the encrypted biometric data 64 and encrypted electronic file 68 thus produced can only be decrypted using the servers private encryption key 40b stored in the key database 43 of the server 20.

Other methods can of course also be applied for encrypting the biometric data 54 and/or the electronic file 48 to be signed. By way of example, particularly for encrypting large files it may be expedient to generate a unique symmetric key for each encryption event and encrypt the file using the key (e.g. with the AES symmetric algorithm), with the symmetric key being encrypted utilising the server's PKI public encryption key 40a and being also transferred to the server 20 by the client device 10. Thereby, in the first step on the server-side the symmetric encryption key has to be decrypted using the server's private encryption key 40b, and the encrypted file(s) can then be decrypted using this symmetric key. The advantage of this two-stage encryption process is that the symmetric algorithm is much faster than asymmetric encryption algorithms, with a smaller size overhead on the encrypted data files, so even large-sized files can be encrypted quickly.

In step 8, the signed evidence record 72, the preferably encrypted biometric data 64 and the preferably encrypted electronic file 68 are transferred by the client device 10 to the server 20 through the communications channel 30. In addition to that, preferably one or more user data 74 items (such as user identifier, user PIN, etc.) are sent to the server 20 by the client device 10 before, during or after the completion of the above presented method. By way of example, during the generation of the evidence record 70 also the user data 74 can be associated with the above listed components. The user data 74 can, however, be sent to the server 20 (preferably encrypted) separately from the evidence record 70, typically for user identification, which requires at least such identifier data on the basis of which the server 20 can, for example, find out which user's private signing key 42 is to be used of the keys stored in the key database 43, or, for example, establish which user's user data 74 are to be used for generating the digital signature (described in detail below) of the data stored in the user database 44, or, for example, establish which user's biometric template 45a—the unique biometric sample (template) corresponding to the given user—is to be retrieved from the biometric database 45. Other information made available to the server 20 by data communication may also perform the function of the user identifier—functioning as user data 74—such as a phone number (if a smartphone is applied as client device 10), or a static IP address (in case a desktop computer is applied as client device 10), etc.

Figure 4:
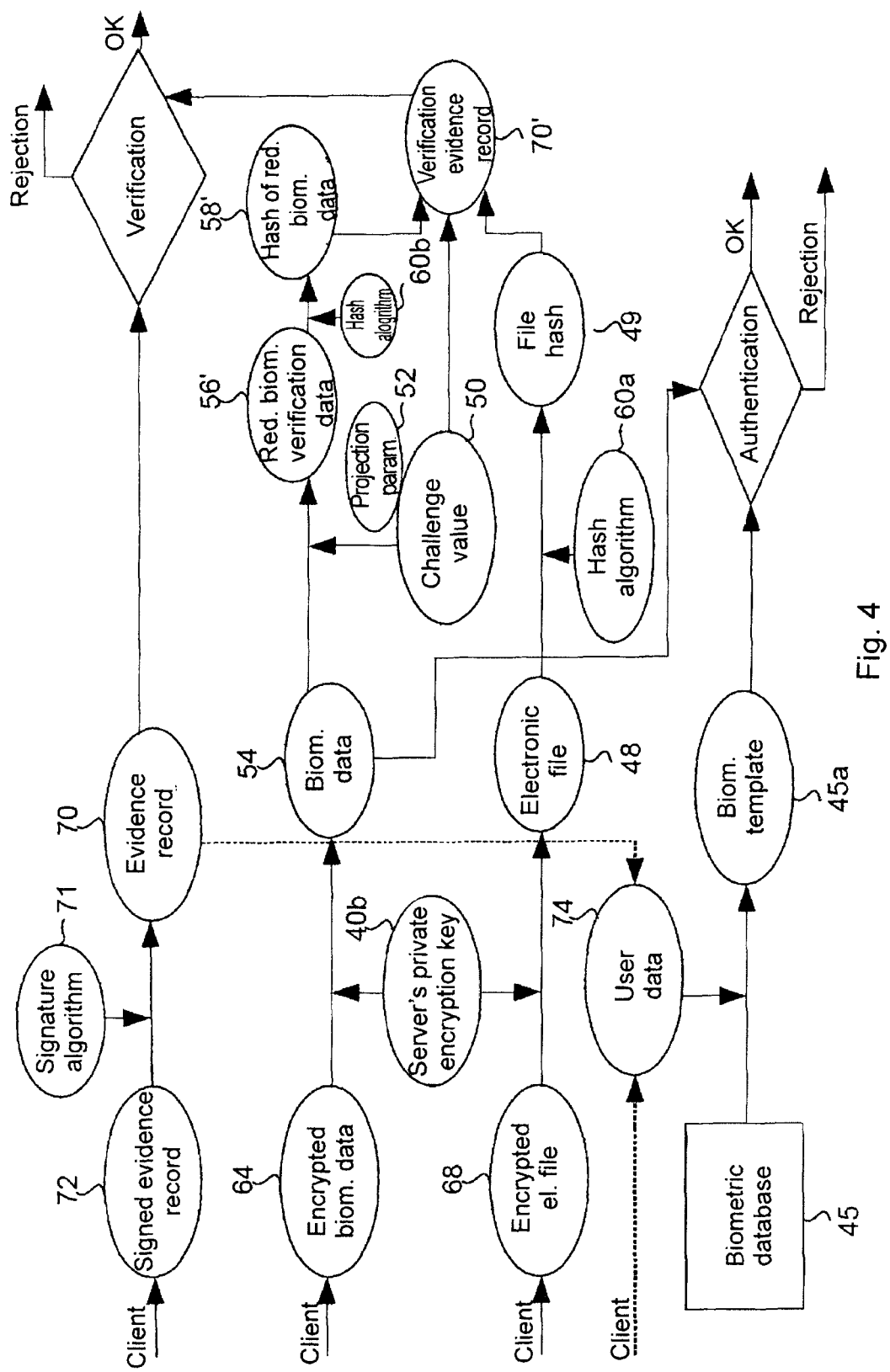
FIG. 4 is a schematic flow diagram of server-side verification and authentication steps of a first embodiment of the method according to the invention.

Steps 9-11 of a first variant of the method according to the invention presented in FIG. 2 are illustrated in detail in FIG. 4.

In step 9, the server 20 is applied for identifying the user of the client device 10 and for defining at least one user data 74 item. This latter can be user data 74 sent by the client device 10, or further user data 74 items retrieved from the user database 44 based on the user data 74 sent by the client device.

An event related to step 9 may be user authentication, during which, by way of example, the signature of the evidence record 72 signed by the client device 10 is verified, and the user is authenticated accordingly.

In a particularly preferred embodiment, however, authentication is performed based on the biometric data 54. To perform authentication, in step 10 first the encrypted biometric data 64 sent by the client device 10 are decrypted with the server's private encryption key 40b (or, optionally, using the symmetric key decrypted with the server's private encryption key 40b). Next, the biometric template 45a corresponding to the user specified by the user data 74 is retrieved from the biometric database 45, the biometric template 45a being then compared by the server 20 against the decrypted biometric data 54 using a suitable software program (by way of example, a software program comprising neural network-based, projection-based, CRC-based or other similar algorithms). For example, the authenticity of the handwritten signature is verified by the program running on the server 20 using earlier specimen signatures of the given user as a biometric template 45a. In case authentication is successful, i.e. the transferred biometric data 54 matches the one or more biometric template 45a stored for the given user, the process continues, otherwise the request for signing the electronic file 48 is rejected and the process is stopped.

The advantage of authentication performed using biometric data 54 is that the user does not have to remember any PIN codes. Authentication performed using a handwritten signature as biometric data 54 is particularly preferred because it is the closest thing to signing a paper document in the accustomed way.

Preferably, all biometric data 54 sent to the server 20 are stored in the biometric database 45 as respective biometric templates 45a corresponding to the given users, while the server 20 also checks whether the biometric data 54 currently submitted is identical to biometric templates 45a stored earlier, or portions thereof, thereby providing protection against re-submitting earlier biometric data 54.

In step 11 a verification evidence record 70' is generated utilising the server 20 according to the following (see FIG. 4):

The server 20 is utilised for generating reduced biometric verification data 56' from the biometric data 54 applying a projection using the projection parameter 52 sent in the challenge value 50, with the same projection algorithm that was used at the client side for generating the reduced biometric data 56. Subsequently, the hash 58' of the reduced biometric verification data 56' is generated with the same hash algorithm 60b that was applied at the client side for generating the hash 58 of the reduced biometric data 56.

Next, the server 20 is utilised for generating the hash 49' of the electronic file 48 with the same hash algorithm 60a that was used for generating the hash 49 of the electronic file 48 at the client side.

A verification evidence record 70' is then generated by the server 20, associating the challenge value 50, the hash 58' of the reduced biometric verification data 56', and the hash 49' of the electronic file 48, and is compared against the evidence record 70 sent by the client device 10. In case the verification evidence record 70' is identical to the evidence record 70 sent by the client device 10, the digital signature process is continued, otherwise the request is rejected and the process is halted.

Figure 5:
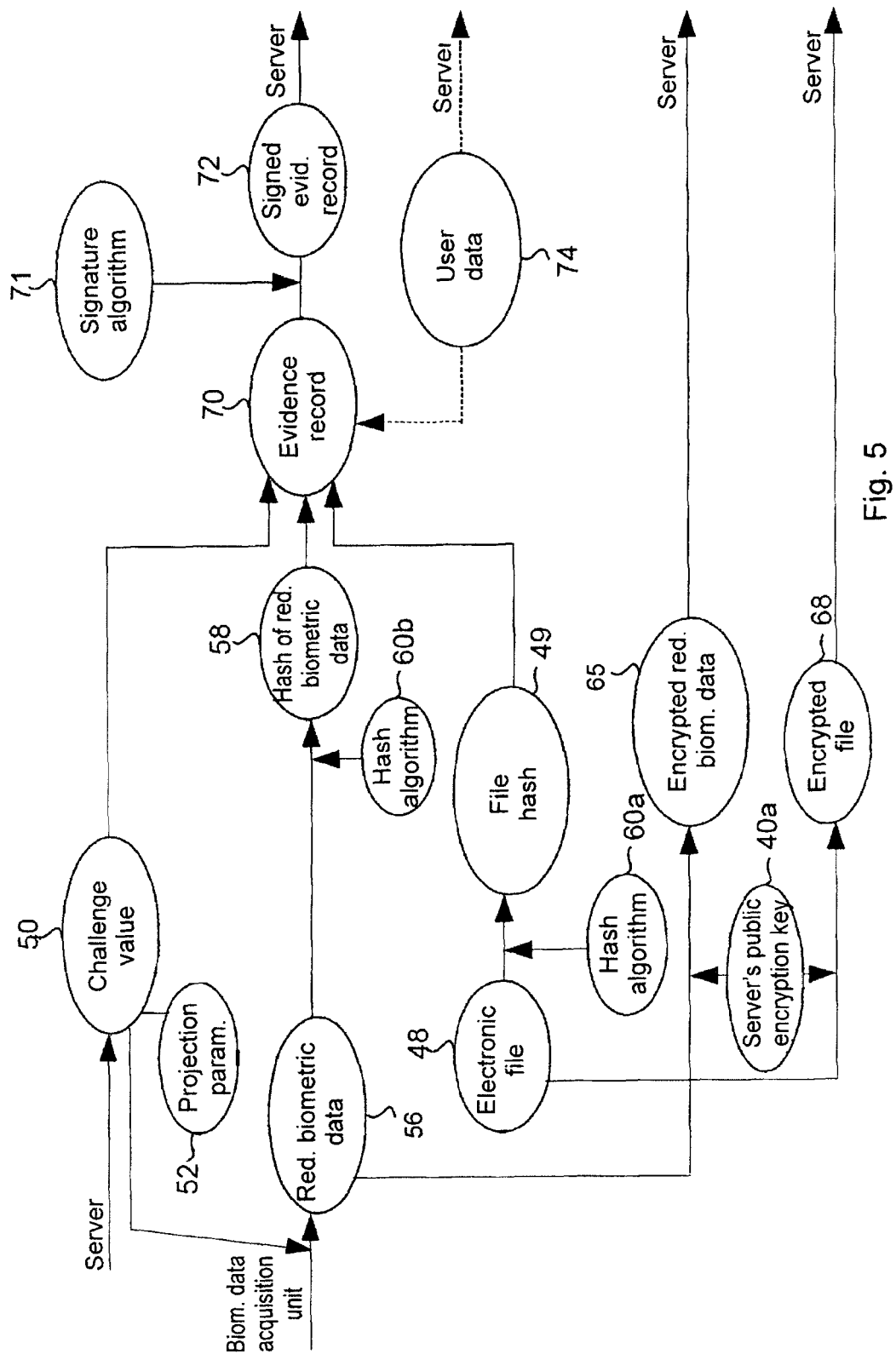
FIG. 5 is a flow diagram of a further embodiment obtained by the modification of the embodiment illustrated in FIG. 3.
Figure 6:
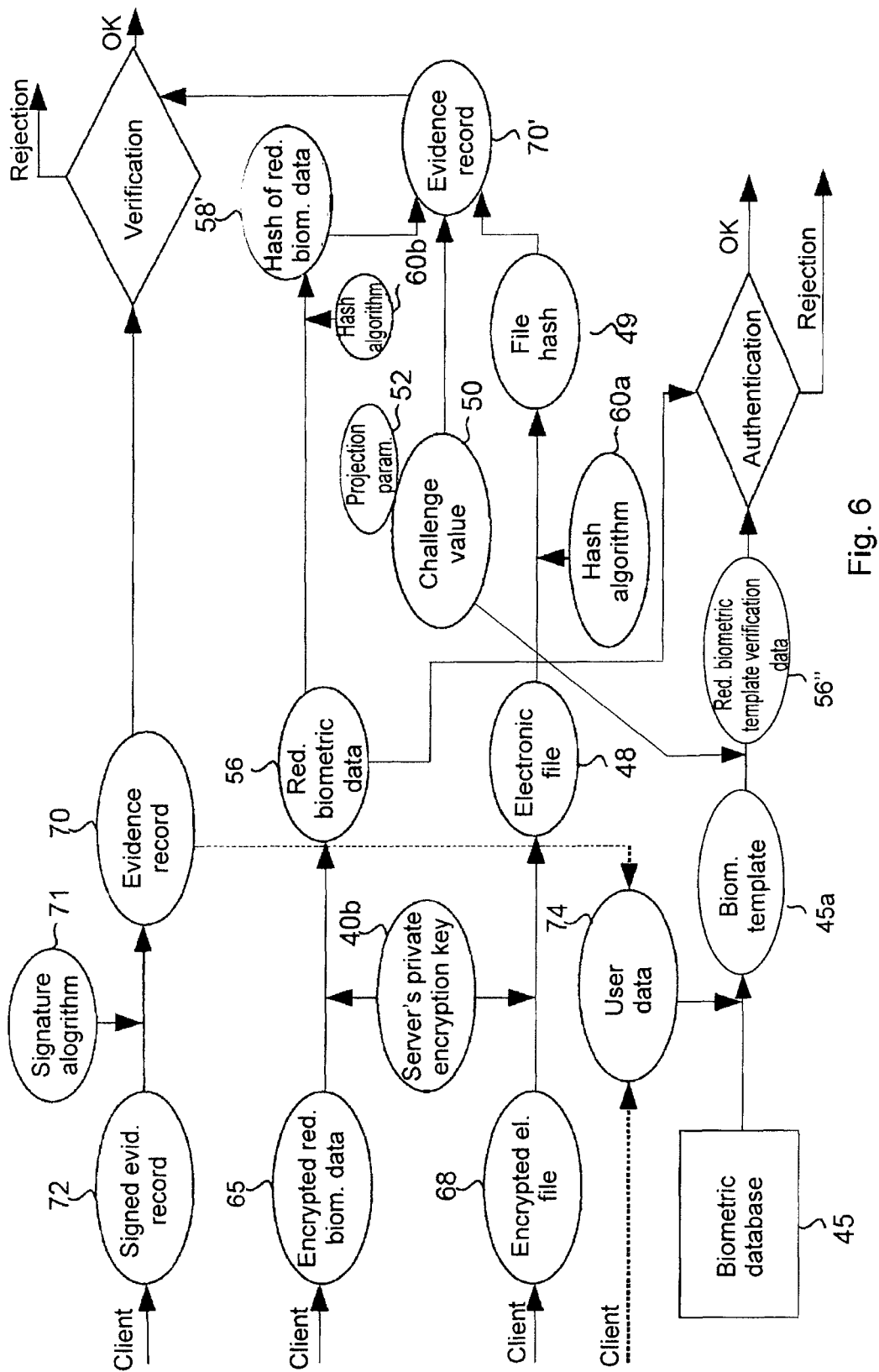
FIG. 6 is a server-side flow diagram related to FIG. 5, obtained by modifying the embodiment illustrated in FIG. 4.

Corresponding steps of a second variant of the method according to the invention are illustrated in FIG. 5 and FIG. 6, which correspond to modified versions of FIG. 3 and FIG. 4, respectively.

Regarding the protection against the theft and reuse of biometric data it is preferable if projection parameter(s) submitted with the challenge value is(are) applied not for the subsequent reduction of recorded biometrics, but a reduced data recording is performed according to a reduction corresponding to the parameters. Indeed, reduced biometrics can be generated from recorded biometric data for any parameter values, if the stored biometric data are accessible. In case, however, the parameter values themselves affect the recoding process, the recorded reduced biometric data cannot be used later for producing a reduction corresponding to different parameter values.

In case of handwritten signatures an exemplary solution is where a portion of the parameter includes a text which is to be handwritten by the signatory, and in case the same text is never to be written twice it is ensured that no handwriting corresponding to a different parameter value (text) can later be generated using a fixed text recorded earlier.

The implementation of the projection parameter and the biometric data reduction corresponding thereto can be classified in three major categories. Each of these categories involve a transformation performed depending on the parameter (these three categories can be applied also for the first variant of the invention, shown in FIG. 3 and FIG. 4).

1. Reduced biometrics, where a transformation is determined directly by the given parameter. Examples:
   the projection of velocity onto a straight line of a given direction (signature),
   the projection of acceleration onto a straight line of a given direction (signature),
   sampling using given X, Y, Z values (signature),
   image information retrieved from given positions determined by the parameter (signature, fingerprint, iris),
   the projection of characteristic points onto a straight line of a given direction (fingerprint, iris).

2. Reduced biometrics, where the parameter is for selecting the authentication algorithm (or more than one algorithms at the same time). In this case the verification result of the biometric data is composed of the individual verification results of multiple characteristic features. For example, the temporal change of the X- and Y-direction velocities and the angles of the tangent vectors are checked; and the final decision is taken based on the scores yielded by the individual comparisons. In this case the reduction parameter determines only the type of reduction that is to be performed by the recording device. If, for example, the parameter indicates that the authentication is to be performed using the X-direction acceleration and the change of angle of the tangent vector, then these two data series (=reduced biometrics) will be recorded, from which it is impossible to restore the original biometrics. Examples:
   tangent vector (signature),
   X- and Y-direction velocities and accelerations (signature),
   pressure force (signature).

3. Reduced biometrics, where a transformation is determined indirectly by the given parameter. By way of example, solutions implemented using neural networks fall in this category. For example, the neural network applied for authentication may consist of 3 layers. The given neural network has a fixed structure, and the same network—defined by its structure and weights—is always applied for authenticating a given person. A unique neural network is trained for each person to be authenticated, which network can only be applied for recognising the given person. The parameter value expediently contains the weights and optionally other settings of the first layer of the neural network. During the registering process, all of the second layer's input parameters are calculated based on the projection parameter 52 sent by the server, which effectively constitutes the reduced biometrics from which it is impossible to restore the signature. The authentication module does not have to compute the neural network again based on the parameter value (the network is already known to the module because it was built during the signature registering process), and thus all the server has to do is make sure that the first layer defined by the parameter is identical to the first layer of the neural network that is already known, and if so, the 2nd and 3rd layers will be run in the authentication module.

If the network has 5 layers and the submitted parameter contains the data of the first two layers, then the inputs of the 3rd layer will be received from the client side as reduced biometrics, and the server will run the 3rd, 4th and 5th layers in the authentication module.

The biometric templates applied in case of the three above mentioned categories are as follows.

In case of category 1 the biometric database 45 and the biometric templates 45a contained in it typically include the biometric samples themselves that were recorded earlier (e.g. signatures), since they can be applied for computing all the information required during the authentication process. The data reduction parameters, such as the parametrisation of the projection line or the parameters of other selection decisions are different for each session, and the reduction mappings should be able to be calculated again also for the samples/signatures contained by the template. A special subcase of this could be when a finite number of pre-recorded "projections", i.e. reduced biometrics are applied (for example, projections onto 3 predetermined lines), in which case the reference data series need not be re-computed by the authentication module using the full biometric data set (recorded at the time of registration), since the data can be computed in advance, during the registration process. Thereby, even such embodiments can be implemented wherein the full biometric sample is not known even to the authentication module itself.

In case of categories 1 and 2, therefore, the biometric template of a given person may consist of the pre-computed reduced data series, since these data can be generated at the time the person is registered.

For the neural network variant of category 3, however, the biometric template of a person is constituted by the weight values and settings of the neural network trained specifically for the given person. The neural network has to exist at the time the parameter value is submitted (since the parameter is constituted by the first layers of the network), and—due to its nature—the network cannot be generated (trained) again in exactly the same way as before. The settings of the neural network should therefore be stored in the biometric template.

To sum up, it can therefore be contemplated that the biometric template may:
   include full biometric templates recorded during registration,
   include only certain pre-calculated data series (reduced biometrics), in which case it is not possible to apply arbitrary projections, or
   include a combination of full biometric samples and pre-calculated data series.

Of course, during the verification of a biometric identifier all possible combinations of the above parameters may occur, i.e. it may happen that, as specified by the projection parameter 52 of the challenge value 50, for authentication a given projection of the X-direction acceleration, the values obtained by a given algorithm (e.g. based on pressure force), and the input values of the second layer of the neural network corresponding to the given person are required. Authentication is then finally provided by combining these partial authentications.

FIG. 5 shows a flow diagram including the client-side steps of a second variant of the invention. By comparing FIGS. 3 and 5 it is seen that this second variant of the invention differs from the embodiment described above in that, for enhanced safety, the full biometric data are not recorded at the client side, but instead the projection parameter 52 carried by the challenge value 50 already determines the manner in which biometric data are recorded, i.e. instead of the full biometrics only the reduced biometric data 56 are recorded at the client side. The reduced data can be recorded in different ways. In an exemplary case it may be contemplated that, taking into account the projection parameter 52, the biometric data acquisition unit 18*a* stores in its memory and passes on for further processing exclusively the reduced biometric data 56. Such a variant can also be contemplated wherein the full biometric data is temporarily present in the memory of the biometric data acquisition unit 18*a* but only the partial content determined by the projection parameter 52 is recorded and submitted.

In addition to that, the embodiment according to FIG. 5 differs from the embodiment illustrated in FIG. 3 in that in the course of the method only the reduced biometric data 56 are available for submission to the server 20, preferably in encrypted form, i.e. as encrypted reduced biometric data 65.

In accordance with the above—in any and all embodiments of the method according to the invention—the data content of the projection parameter 52 included in the challenge value 50 can vary very widely. There can be contemplated a case wherein the challenge value 50 is constituted by the projection parameter 52 itself, consisting of a single parameter only. It may also be contemplated that the challenge value 50 contains further data in addition to the projection parameter 52, which data do not take part in the data reduction process. The projection parameter 52 can be a single parameter or even a parameter set, as it is required for the input layer, the weights of the layers, and optionally other parameters of the network in case of data processing by a neural network. In the context of the present application, by projection parameter 52 there is meant in the widest possible sense any parameter or parameter set described above. The term "projection" in this context does not imply that data reduction can only be performed by projection taken in the narrow sense, but by the projection parameter 52 there is meant any parameter by which data reduction of the biometric sample can be performed. By projection parameter 52, therefore, any type of data reduction parameter or parameter set is understood in the widest possible sense.

In FIG. 6 the processes related to the server-side steps of the second variant of the invention, shown in FIG. 5, are illustrated. By comparing FIGS. 6 and 4 it can be seen that in this second embodiment the full biometric data set is not received at the server's side, only the—preferably encrypted—encrypted reduced biometric data 65. From these data—in case encryption is applied—the reduced biometric data 56 are decrypted using the server's private encryption key 40*b*, and can be later applied for generating the verification evidence record 70' or preferably for authentication purposes.

In the process according to FIG. 6 the reduced biometric data 56 are available at the server side, without there being a need for the projection parameter 52 to produce them. As it can be seen, this embodiment of the invention is more secure than the embodiments according to FIGS. 3 and 4 because here the full biometric sample is not communicated, not even in encrypted form.

In the present embodiment the reduced biometric data 56 can be utilised for authentication at the server side. The biometric template 45*a* corresponding to the given user is identified among the biometric templates 45*a* stored in the biometric database 45 utilising the corresponding user data 74, and then the reduced biometric template verification data 56" are produced from the given biometric template 45*a* by means of the projection parameter 52 carried by the challenge value 50. Authentication can therefore be carried out by comparing the reduced biometric data 56 (being received from the client side in encrypted form and then decrypted) and the reduced biometric template verification data 56".

Figure 7:
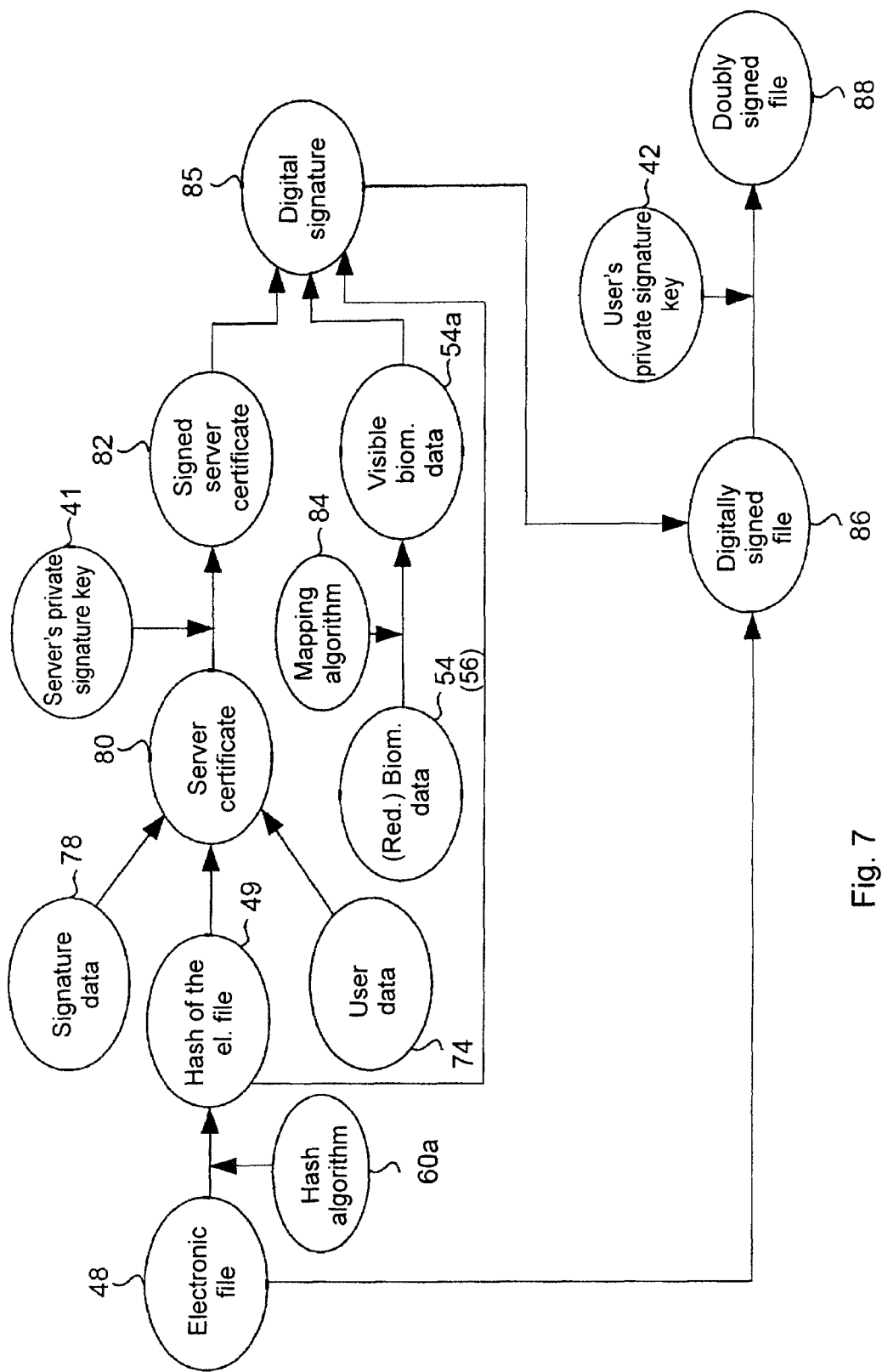
FIG. 7 is a schematic flow diagram of the encryption of an electronic file by the server.

Steps 12-16 of the method according to the invention are illustrated in detail in FIG. 7. In step 12 the server 20 is applied for generating a server certificate 80 by associating at least the hash 49 of the electronic file 48, the at least one user data 74 item, and at least the signature data 78 related to the time of the signature.

The at least one user data 74 item can be user data 74 sent by the client device 10, or other data retrieved from the user database 44 based on the user data 74 sent by the client device. User data 74 applied for generating the server certificate 80 comprise typically one or more of the following data items: the user's (signatory's) name, birth data, birthplace, mother's name, address, ID card number, etc.

Signature data 78 are metadata that describe the "circumstances" of the signature event, comprising typically one or more of the following: date of signing, information on the client device 10, information on the server 20, the name of the signed electronic file 48, etc.

In step 13 the server certificate 80 is preferably signed by the server 20 with the server's private signing key 41, in order to produce a signed server certificate 82 that can later be utilised to definitively establish that the signature originated from the server 20. The server's private signing key 41 may be identical to the server's private encryption key 40*b* applied during the previous steps. The signed server certificate 82 can, however, be generated utilising a different key, or a different signing algorithm, the applicable signature algorithms for example include algorithms of the HMAC (hash-based message authentication code) type.

In step 14 (which may precede steps 12 and 13) the server 20 is utilised for generating visually displayable biometric data 54*a* optionally from the biometric data 54 (or in case of the embodiment according to FIGS. 5 and 6, from the reduced biometric data 56) with a one-way mapping algorithm 84. For example, a static signature image is produced from the recorded dynamic data of a handwritten signature. It may also be contemplated that the visually displayable biometric data 54*a* are produced from other types of biometric data 54 (such as fingerprints, palm vein images, iris images), but in case of these biometric data types visually displayable biometric data 54*a* is not typically produced. The mapping algorithm 84 may optionally also be based on the projection algorithm implemented using the projection parameter 52.

In step 15, the server 20 is utilised for generating a digital signature 85 by associating the signed server certificate 82, the hash 49 of the electronic file 48, and—in case they are available—the visually displayable biometric data 54. During this step, data association is preferably performed by packaging the data in a data package. Subsequently, the digital signature 85 is associated with the electronic file 48, by way of example by embedding it therein, or by including both in a common standard—for example, XML—file, thereby producing a digitally signed electronic file 86. Embedding is preferably performed such that the visually displayable biometric data 54*a* can be viewed as a signature image upon opening the digitally signed electronic file 86. The digital signature 85 may of course also contain other data.

Preferably in step 16, the digitally signed electronic file 86 is also signed on behalf of the user utilising the server 20, by way of example applying the user's private signing key 42 so as to obtain a doubly signed electronic file 88. Using the user's public signing key anyone can make it sure that the doubly signed electronic file 88 was signed with the user's private signing key 42 corresponding to the given user (the signatory).

Figure 8:
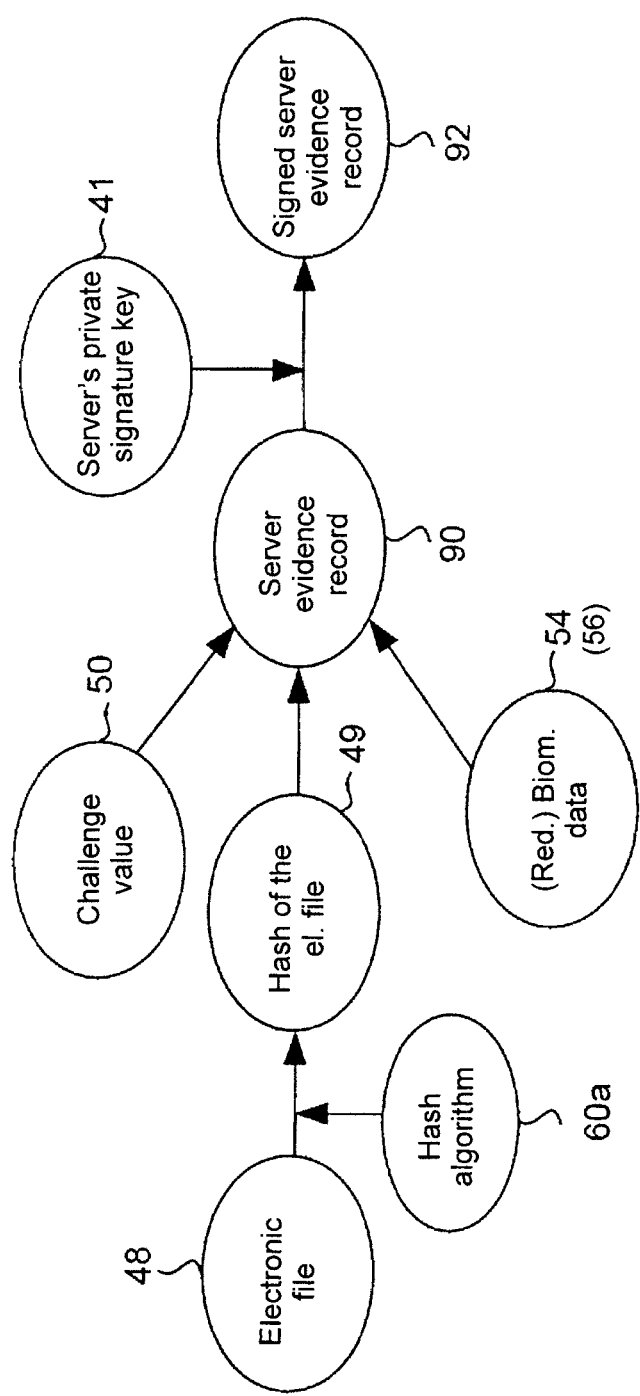
FIG. 8 is a schematic flow diagram of producing and signing a server evidence record.

Step 17 of the method according to the invention is illustrated in detail in FIG. 8.

In step 17 the server 20 is utilised for generating a server evidence record 90 by associating at least the challenge value 50, the biometric data 54 (or, in the embodiment according to FIGS. 5 and 6, the reduced biometric data 56) and the hash 49 of the electronic file 48 (for example by the bitwise XOR operation mentioned above, or with a hash algorithm), the server evidence record 90 being then signed with the server's private signing key 41, and the signed server evidence record 92 thus obtained being stored. The circumstances of the signing event, as well as the data utilised in the course thereof, can be known from the signed server evidence record 92 using the server's public signing key 40*a*. The server evidence record 90 can be used later on (even years later) to prove that the given signing transaction with the given content did actually take place. This may be required for example for a court proceedings. In such cases the full biometric data 54 might be required, and therefore preferably the full biometric data set is included in the server evidence record 90 rather than only the reduced biometric data 56, the hash 58 thereof, or the visible biometric data 54*a*.

The above process may be carried out in case of multiple signatories, when of course the biometric data 54 of more than one users are recorded using the biometric data acquisition unit 18*a*, carrying out the respective operations for each biometric data 54 set, while at the server side visible biometric data 54*a* are produced from all of the biometric data 54 sets, and are all included in the digital signature 85.

As it can be understood from the above discussion, the invention goes against the general engineering approach preferring simplification. Common engineering sense would suggest that a common digital signature should be applied to the biometric data and the original document, thereby "linking" both in an authentic manner. In this case, provided the biometrics and the document are known, it can be verified whether the given biometrics correspond to the given document. However, if a person possesses the biometrics, then by copying it he can use it to produce another document. The invention makes this conventional solution more secure; in order to prevent the biometrics from getting disclosed it is stored and used in an encrypted/reduced form.

In the prior art, correspondence of the biometrics and the document could only be verified by a trusted entity that was authorised to remove the encryption of the biometrics. However, verification could be aimed at also by entities that are not considered trusted. The solution according to the invention also allows a non-trusted entity to verify the authenticity of the documents (without decrypting the encrypted biometrics).

The solution according to the invention therefore goes against the principles of simplification in the following manner:

The solution is adapted for producing challenge-based reduced biometrics that are included in an evidence record signed using both the document and the challenge parameters. The signed evidence record and the reduced biometrics can be handed over to any non-trusted entity because it cannot be applied for restoring the original biometrics due to the characteristics of the projection algorithm, while the reduced value will be unique for each signature since it can only be generated using different parameters every time (i.e. no two identical reduced images need to be applied even in case of identical biometrics). Since the authenticity of the signed evidence record can be verified by the non-trusted entity, the entity can make sure that the appropriate biometrics are linked with the given document.

The authentication method according to the invention also comprises the above described steps, with any of the preferred embodiments presented above being applicable for the authentication method. In the course of the authentication method according to the invention

- a challenge value 50 comprising a projection parameter 52 is transferred from the server 20 to a client device 10 through a communications channel 30,
- the biometric data acquisition unit 18*a* connected to the client device 10 is utilised for recording reduced biometric data 56 applying a projection utilising the projection parameter 52,
- the client device 10 is utilised for transferring the reduced biometric data 56 to the server 20 through the communications channel 30,
- the server 20 is utilised for identifying the user of the client device 10,
- reduced biometric template verification data 56" are generated from the user's biometric template 45*a* applying a projection comprising the projection parameter 52, and the authentication is performed by comparing the reduced biometric data 56 against the reduced biometric template verification data 56".

In a preferred embodiment the user is identified based on the reduced biometric data 56.

Because the above steps can be found in FIGS. 5 and 6, this authentication method is not illustrated separately. The authentication method is based on a client-server biometric data acquisition architecture wherein the challenge value, sent by the server, is used by a biometric data acquisition unit connected to or incorporated in the client for recording reduced biometric data.

The biometric data acquisition unit may be by way of example a tablet device or a cell phone (smartphone) and the software running on it, i.e. the biometric data acquisition unit is built in the client. The server may, for example, be a central service adapted for identifying the user based on the biometrics recorded by the device and for granting access to specific services depending on the result of the identification. The biometrics may for example be constituted by a handwritten signature on the touchscreen, an iris image taken by the device's camera, a fingerprint recorded by the device (provided the device has the necessary capability), or gesture recognition performed using the device's camera. In case of this embodiment reduction is performed expediently by the software running on the tablet.

The biometric data acquisition device can be a "signature pad" (a digitizer tablet with a stylus which may also have its own display—essentially the same as a tablet device), which is connected to a PC by a USB connector. In this case the "server" can even be the PC itself, running a software application adapted for utilising the recorded handwritten signature data. A remote server can of course be applied also in this case, when it is the PC that sends the data to the server via a communications link. In this embodiment most expediently the data reduction procedure is performed already inside the "signature pad" device, since in this case the full biometrics do not get out of the physically enclosed and protected device.

The biometric data acquisition unit may also be a simple computer mouse connected to a PC. A software application may be applied for recording the user's mouse movements during web browsing. Mouse/hand movements can be regarded as biometric data characteristic for a given individual. Based on the recorded data, psychological characteristics of the user can also be obtained, which can be applied even for displaying customised advertisements targeted at the user. As an alternative to that, a PC-connected camera can be applied for recording the user's eye movements (as biometric data). In these examples data reduction is expediently performed by the software application running on the PC.

In a specific case two types of information can be obtained from a signature pad device during a signature event:
reduced biometrics (which will later on be used by the server to identify the person),
the static image of the signature (which can be visually copied to a document, but in itself is not suitable for reproducing the signature biometrics).

This is advantageous because the crucial biometric data could not be obtained from the device, only the reduced set of information required for identification, but a signature image could still be produced. In this case the challenge value would comprise
a parameter (or parameter set) determining the reduction required for identifying the person, and
another parameter adapted for reducing dynamic biometric data to static ones (i.e. practically the time and pressure force parameters are deleted from the original data set, an image is drawn from the remaining series of points, and is preferably converted to a predetermined size).

In this case the reduced biometrics is the aggregation of the two types of reduced information, with the two portions being used by the server in two different ways.

The authentication method based on reduced biometrics has the advantage that it allows personal identification to be performed by such entities/services that
are not allowed to possess full biometric data due to statutory prohibition or
are not at the security level that would allow them to protect the identity of a person; or
are not sufficiently trusted, as service providers, by the persons to be identified.

The authentication method according to the invention is also applicable for building an anonymous identification system, because biometric data applicable for identity theft are not stored in the client and are not transferred inside the system. In a preferred embodiment multiple cameras can be installed inside the stores and hallways of a shopping mall. The camera system may gather reduced face/body shape/movement information on individual persons, transferring only this reduced information to the server. Based on the reduced information the server tries to recognise the person. In case the person is not recognised, he or she is identified as a new customer, the corresponding biometric sample (reduced data) is stored together with an associated identification number. Subsequently, the system monitors the movement of the person in the mall (which shops he or she enters, before which store windows he or she stops, how much time he or she spends at certain locations, in which restaurant he or she has dinner, which product he or she buys—this latter can be established using the cash desk camera and cash register information), i.e. the system can identify customer habits and preferences. Based on the customer preferences of previously recognised and identified persons the system is capable of displaying personalised advertisements anywhere (e.g. on a dynamic TV wall). The recognition/identification system allows individual stores to present personalised sales offers to customers upon entering the store.

It will be readily understood that other solutions presenting alternatives to the above detailed embodiments may be contemplated by the skilled person, which fall into the scope of protection defined by the following claims.

The invention claimed is:

1. A method for digitally signing an electronic file, characterised by the following steps carried out by a server:
generating a challenge value (50) comprising a projection parameter (52),
transferring the challenge value (50) to a client device (10) through a communications channel (30),
receiving, through a communications channel (30), an evidence record (70), the electronic file (48) to be signed, and a user's biometric data (54) from the client device (10), the evidence record (70) being generated by the client device (10) by associating
the challenge value (50),
a hash (58) of reduced biometric data (56), the reduced biometric data (56) being generated from the biometric data (54) applying a projection utilising the projection parameter (52), and
a hash (49) of the electronic file (48),
generating reduced biometric verification data (56') from the biometric data (54) applying the projection utilising the projection parameter (52),
generating the hash (58') of the reduced biometric verification data (56'),
generating a hash (49) of the electronic file (48),
generating a verification evidence record (70') by associating the challenge value (50), the hash (58') of the reduced biometric verification data (56'), and the hash (49) of the electronic file (48), and comparing it against the evidence record (70) sent by the client device (10) and only continuing the digital signature process if the verification evidence record (70') is identical with the evidence record (70) sent by the client device (10),
identifying the user of the client device (10) and defining at least one user data (74) item,
generating a server certificate (80) by associating at least the hash (49) of the electronic file (48), the at least one user data (74) item, and signature data (78) relating at least to the time of the signature,
signing the server certificate (80) applying the server's private signing key (41), thereby generating a signed server certificate (82), generating a digital signature (85) by associating at least the signed server certificate (82) and the hash (49) of the electronic file (48), and associating the digital signature (85) with the electronic file (48), thereby generating a digitally signed electronic file (86).

2. The method according to claim 1, characterised by signing the digitally signed electronic file (86) on behalf of the user, preferably with the user's private signing key (42).

3. The method according to claim 1, characterised by generating visually displayable biometric data (54*a*) from the biometric data (54) by means of a one-way mapping, wherein also the visually displayable biometric data (54*a*) is associated with the server certificate (80) and with the hash (49) of the electronic file (48) for the generation of the digital signature (85).

4. The method according to claim 1, characterised in that the user is authenticated based on the biometric data (54).

5. The method according to claim 4, characterised by that during authentication the biometric data (54) are compared against a biometric template (45*a*).

6. The method according to claim 1, characterised by receiving, as an evidence record (70), an evidence record (70') signed by the client device (10) and verifying the signature.

7. The method according to claim 1, characterised by receiving, as biometric data (54) and/or as an electronic file (48), biometric data (64) and/or an electronic file (68) encrypted by the client device (10), and decrypting the encrypted biometric data (64) and/or encrypted electronic file (68) before generating the reduced biometric data (56).

8. The method according to claim 7, characterised by receiving encrypted biometric data (64) and/or an encrypted electronic file (68) encrypted with the server's public encryption key (40*a*) and decrypting it with the server's private encryption key (40*b*), or receiving encrypted biometric data (64) and/or an encrypted electronic file encrypted with the server's public encryption key (40*a*) and decrypting the encrypted symmetric key with the server's private encryption key (40*b*), subsequently decrypting the encrypted biometric data (64) and/or electronic file (68) with the symmetric key.

9. The method according to claim 1, characterised by generating, by associating at least the challenge value (50), the biometric data (54) and the hash (49) of the electronic file (48), a server evidence record (90), signing the server evidence record (90) preferably with the server's private signing key (41), and storing the resulting signed server evidence record (92).

10. The method according to claim 1, characterised by recording a user's biometric data (54) by means of a biometric data acquisition unit (18*a*), and by means of the client device (10):

generating, applying a projection utilising the projection parameter (52), reduced biometric data (56) from the biometric data (54), generating the hash (58) of the reduced biometric data (56), generating the hash (49) of the electronic file (48), generating an evidence record (70) by associating at least the challenge value (50), the hash (58) of the reduced biometric data (56), and the hash (49) of the electronic file (48), and transferring the evidence record (70), the electronic file (48) to be signed and the biometric data (54) to the server (20) through the communications channel (30).

11. The method according to claim 10, characterised by signing the evidence record (70) by the client device (10) and verifying the signature by the server (20).

12. The method according to claim 10, characterised by encrypting the biometric data (54) and/or the electronic file (48) to be signed by the client device (10) before transferring the biometric data (54) and/or the electronic file (48) to be signed.

13. The method according to claim 10, characterised in that the biometric data acquisition unit (18*a*) is a digitizer tablet, whereby a hand-written signature is received and recorded as biometric data (54), preferably as at least one type of biometric data (54) selected from the following group: coordinates of the location of pressing the writing device, coordinates of the location of lifting the writing device, time function of writing device coordinates, time function of writing device speed, time function of writing device acceleration, time function of writing device pressure force.

14. The method according to claim 10, characterised in that the biometric data acquisition unit (18*a*) is an iris scanner, whereby an iris image is received, and digital data representing the iris image are stored as biometric data (54).

15. The method according to claim 10, characterised in that the biometric data acquisition unit (18*a*) is a fingerprint reader, whereby a fingerprint is received, and digital data representing the fingerprint are stored as biometric data (54).

16. A method for digitally signing an electronic file, characterised by generating by a server (20) a challenge value (50) comprising a projection parameter (52), transferring by the server (20) the challenge value (50) to a client device (10) through a communications channel (30), recording biometric data (54) by a biometric data acquisition unit (18*a*), by applying a projection utilising the projection parameter (52), generating reduced biometric data (56) from the biometric data (54) by means of the client device (10), generating the hash (58) of the reduced biometric data (56) by means of the client device (10), generating the hash (49) of the electronic file (48) by means of the client device (10), generating by the client device (10) an evidence record (70) by associating at least the challenge value (50), the hash (58) of the reduced biometric data (56), and the hash (49) of the electronic file (48), transferring by the client device (10) the evidence record (70), the electronic file (48) to be signed and the biometric data (54) to the server (20) through the communications channel (30), generating by the server (20) reduced biometric verification data (56') from the biometric data (54) applying a projection utilising the projection parameter (52), generating by the server (20) a hash (58') of the reduced biometric verification data (56'), generating by the server (20) a hash (49) of the electronic file (48), generating by the server (20) a verification evidence record (70') by associating the challenge value (50), the hash (58') of the reduced biometric verification data (56'), and the hash (49) of the electronic file (48), and for comparing it against the evidence record (70) sent by the client device (10) and only continuing the digital signature process if the verification evidence record (70') is identical with the evidence record (70) sent by the client device (10), identifying by the server (20) the user of the client device (10), and defining at least one user data (74) item, generating by the server (20) a server certificate (80) by associating at least the hash (49) of the electronic file (48), the at least one user data (74) item, and signature data (78) relating at least to the time of the signature, signing by the server (20) the server certificate (80) applying the server's private signing key (41), thereby generating a signed server certificate (82), generating by the server (20) a digital signature (85) by associating at least the signed server certificate (82) and the hash (49) of the electronic file (48), and associating by the server (20) the digital signature (85) with the electronic file (48), thereby generating a digitally signed electronic file (86).

17. The method according to claim 16, characterised by signing by the server (20) the digitally signed electronic file (86) on behalf of the user, preferably with the user's private signing key.

18. The method according to claim 16, characterised by generating by the server (20) visually displayable biometric data (54a) from the biometric data (54) by means of a one-way mapping, wherein also the visually displayable biometric data (54a) is associated with the server certificate (80) and with the hash (49) of the electronic file (48) for the generation of the digital signature (85).

19. The method according to claim 16, characterised by authenticating the user by means of the server (20) based on the biometric data (54), in the course of which the biometric data (54) are preferably compared against a biometric template (45a).

20. The method according to claim 16, characterised by generating, by associating at least the challenge value (50), the biometric data (54) and the hash (49) of the electronic file (48), a server evidence record (90) by the server (20), signing the server evidence record (90) preferably with the server's private signing key (41), and storing the resulting signed server evidence record (92).

21. The method according to claim 16, characterised by signing the evidence record by the client device (10) and verifying the signature by the server.

22. The method according to claim 16, characterised by encrypting by the client device (10) the biometric data (54) and/or the electronic file (48) before transferring them, thereby generating encrypted biometric data (64) and/or an encrypted electronic file (68), and decrypting by the server (20) the encrypted biometric data (64) and/or the encrypted electronic file (68).

23. A method for digitally signing an electronic file, characterised by the steps carried out by means of a server:

generating a challenge value (50) comprising a projection parameter (52), transferring the challenge value (50) to a client device (10) through a communications channel (30), receiving from the client device (10), through a communications channel (30), an evidence record (70), the electronic file (48) to be signed, and a user's reduced biometric data (56) reduced in accordance with the projection parameter (52), the evidence record (70) being generated by the client device (10) by associating the challenge value (50), a hash (58) of reduced biometric data (56), and a hash (49) of the electronic file (48), generating the hash (58') of the reduced biometric data (56), generating the hash (49) of the electronic file (48), generating a verification evidence record (70') by associating the challenge value (50), the hash (58') of the reduced biometric data (56), and the hash (49) of the electronic file (48), and comparing it against the evidence record (70) sent by the client device (10) and only continuing the digital signature process if the verification evidence record (70') is identical with the evidence record (70) sent by the client device (10), identifying the user of the client device (10), and defining at least one user data (74) item, generating a server certificate (80) by associating at least the hash (49) of the electronic file (48), the at least one user data (74) item, and signature data (78) relating at least to the time of the signature, signing the server certificate (80) applying the server's private signing key (41), thereby generating a signed server certificate (82), generating a digital signature (85) by associating at least the signed server certificate (82) and the hash (49) of the electronic file (48), and associating the digital signature (85) with the electronic file (48), thereby generating a digitally signed electronic file (86).

24. The method according to claim 23, characterised by authenticating the user based on the reduced biometric data (56), during which authentication a projection comprising a projection parameter (52) is applied for generating, from the user's biometric template (45a), reduced biometric template verification data (56"), and comparing the reduced biometric data (56) against the reduced biometric template verification data (56").

25. The method according to claim 24, characterised by receiving, as reduced biometric data (56), encrypted reduced biometric data (65) encrypted by the client device (10), and decrypting the encrypted reduced biometric data (65) prior to authentication.

26. The method according to claim 23, characterised by recording the user's reduced biometric data (56) by means of a biometric data acquisition unit (18a), generating the hash (58) of the reduced biometric data (56), generating the hash (49) of the electronic file (48), generating an evidence record (70) by associating at least the challenge value (50), the hash (58) of the reduced biometric data (56), and the hash (49) of the electronic file (48), and transferring the evidence record (70), the electronic file (48) to be signed and the reduced biometric data (56) to the server (20) through the communications channel (30).

27. Method for digitally signing an electronic file, characterised by generating by a server (20) a challenge value (50) comprising a projection parameter (52), transferring by the server (20) the challenge value (50) to a client device (10) through a communications channel (30), by means of a biometric data acquisition unit (18a) connected to the client device (10), recording reduced biometric data (56) applying a projection utilising the projection parameter (52), generating a hash (58) of the reduced biometric data (56) by means of the client device (10), generating by the client device (10) a hash (49) of the electronic file (48), generating by the client device (10) an evidence record (70) by associating at least the challenge value (50), the hash (58) of the reduced biometric data (56), and the hash (49) of the electronic file (48), transferring by the client device (10) the evidence record (70), the electronic file (48) to be signed and the reduced biometric data (56) to the server (20) through the communications channel (30), generating by the server (20) the hash (58') of the reduced biometric data (56), generating by the server (20) the hash (49) of the electronic file (48), generating by the server (20) a verification evidence record (70') by associating the challenge value (50), the hash (58') of the reduced biometric data (56), and the hash (49) of the electronic file (48), and comparing it against the evidence record (70) sent by the client device (10) and only continuing the digital signature process if the verification evidence record (70') is identical with the evidence record (70) sent by the client device (10), identifying the user of the client device (10) by means of the server (20) and defining at least one user data (74) item, generating by the server (20) a server certificate (80) by associating at least the hash (49) of the electronic file (48), the at least one user data (74) item, and signature data (78) relating at least to the time of the signature, signing by the server (20) the server certificate (80) applying the server's private signing key (41), thereby generating a signed server certificate (82), generating a digital signature (85) by the server (20) by associating at least the signed server certificate (82) and the hash (49) of the electronic file (48), and associating by the server (20) the digital signature (85) with the electronic file (48), thereby generating a digitally signed electronic file (86).

28. The method according to claim 27, characterised by authenticating by the server (20) the user based on the reduced biometric data (56), during which authentication a projection comprising a projection parameter (52) is applied for generating, from the user's biometric template (45*a*), reduced biometric template verification data (56"), and comparing the reduced biometric data (56) against the reduced biometric template verification data (56").

29. The method according to claim 27, characterised by encrypting the reduced biometric data (56) by the client device (10) before transferring them, thereby generating encrypted reduced biometric data (65) by the server.

* * * * *